(12) United States Patent
Proudfoot et al.

(10) Patent No.: US 11,126,528 B2
(45) Date of Patent: Sep. 21, 2021

(54) METHODS FOR GENERATING A BRANCH HEALTH INDEX

(71) Applicant: JPMorgan Chase Bank, N.A., New York, NY (US)

(72) Inventors: Joseph H. Proudfoot, New Albany, OH (US); Ravi Shankar Budur, Bengaluru (IN)

(73) Assignee: JPMorgan Chase Bank, N.A., New York, NY (US)

( * ) Notice: Subject to any disclaimer, the term of this patent is extended or adjusted under 35 U.S.C. 154(b) by 177 days.

(21) Appl. No.: 16/451,460

(22) Filed: Jun. 25, 2019

(65) Prior Publication Data
US 2019/0391896 A1    Dec. 26, 2019

Related U.S. Application Data

(60) Provisional application No. 62/689,912, filed on Jun. 26, 2018.

(51) Int. Cl.
| | | |
|---|---|---|
| *G06F 11/00* | (2006.01) | |
| *G06F 11/32* | (2006.01) | |
| *G06F 11/34* | (2006.01) | |
| *G06F 3/0482* | (2013.01) | |
| *G06F 11/07* | (2006.01) | |

(52) U.S. Cl.
CPC .......... *G06F 11/327* (2013.01); *G06F 3/0482* (2013.01); *G06F 11/076* (2013.01); *G06F 11/3495* (2013.01)

(58) Field of Classification Search
CPC .. G06F 11/076; G06F 11/327; G06F 11/3495; G06F 11/3447; G06F 11/3452
See application file for complete search history.

(56) References Cited

U.S. PATENT DOCUMENTS

| | | | | |
|---|---|---|---|---|
| 5,379,422 | A * | 1/1995 | Antoshenkov | .......... G06F 16/13 |
| 5,984,178 | A | 11/1999 | Gill et al. | |
| 6,966,015 | B2 * | 11/2005 | Steinberg | ............ H04L 41/0609 |
| | | | | 714/26 |
| 7,232,063 | B2 * | 6/2007 | Fandel | .................... G06Q 20/20 |
| | | | | 235/376 |
| 7,545,816 | B1 * | 6/2009 | Coutts | ................ G06Q 20/1085 |
| | | | | 235/375 |

(Continued)

OTHER PUBLICATIONS

Notification of Transmittal of the International Search Report and the Written Opinion of the International Searching Authority issued in PCT/US2019/38945 dated Sep. 20, 2019.

*Primary Examiner* — Elmira Mehrmanesh
(74) *Attorney, Agent, or Firm* — Hunton Andrews Kurth LLP

(57) ABSTRACT

An embodiment of the present invention is directed to generating a branch health index. The innovative method is directed to generating a Branch Health Index (BHI) designed to provide a comprehensive measurement for ATM performance. According to an embodiment of the present invention, BHI takes into account ATM availability, service response/repair times and customer impacts to score every ATM on a predetermined scale. The method applies a weighted scoring algorithm designed to take into account a multitude of attributes. The score may then be used to determine graphical status, such as a red/amber/green status of the ATM.

16 Claims, 6 Drawing Sheets

(56) References Cited

U.S. PATENT DOCUMENTS

| | | | | |
|---|---|---|---|---|
| 8,078,912 | B2* | 12/2011 | Neilan | G07F 19/206 |
| | | | | 714/22 |
| 8,214,290 | B1* | 7/2012 | Vannatter | G07F 19/209 |
| | | | | 705/43 |
| 8,746,551 | B2* | 6/2014 | Bryant | G06F 11/008 |
| | | | | 235/379 |
| 9,208,479 | B2* | 12/2015 | Fuentes | G06Q 40/02 |
| 10,740,183 | B1* | 8/2020 | Blaum | G06F 11/1004 |
| 10,803,437 | B2* | 10/2020 | Vaddadi | H04L 67/10 |
| 2002/0082994 | A1* | 6/2002 | Herziger | G07F 19/20 |
| | | | | 705/43 |
| 2009/0194580 | A1 | 8/2009 | Forsyth et al. | |
| 2012/0303448 | A1 | 11/2012 | Psillas et al. | |
| 2014/0019478 | A1* | 1/2014 | Wu | G06F 11/3495 |
| | | | | 707/770 |
| 2018/0033053 | A1* | 2/2018 | Barak | G06Q 30/0271 |

* cited by examiner

Terminal ID AY0001

| Day | Date | Total Minutes per day (A) | Downtime (minutes) (B) | Availability (B/A) | Weights (C) | Weighted Availability (1-B/A)*C |
|---|---|---|---|---|---|---|
| 1 | 04/26/2018 | 1,440 | 0 | 100% | 0.03 | 3% |
| 2 | 04/27/2018 | 1,440 | 265 | 82% | 0.05 | 4% |
| 3 | 04/28/2018 | 1,440 | 255 | 82% | 0.09 | 7% |
| 4 | 04/29/2018 | 1,440 | 245 | 83% | 0.12 | 10% |
| 5 | 04/30/2018 | 1,440 | 35 | 98% | 0.19 | 19% |
| 6 | 05/01/2018 | 1,440 | 25 | 98% | 0.22 | 22% |
| 7 | 05/02/2018 | 1,440 | 15 | 99% | 0.29 | 29% |
|  |  | 10,080 | 840 | 92% |  | 94% |

Terminal ID AY0002

| Day | Date | Total Minutes per day (A) | Downtime (minutes) (B) | Availability (B/A) | Weights (C) | Weighted Availability (1-B/A)*C |
|---|---|---|---|---|---|---|
| 1 | 04/26/2018 | 1,440 | 0 | 100% | 0.03 | 3% |
| 2 | 04/27/2018 | 1,440 | 15 | 99% | 0.05 | 5% |
| 3 | 04/28/2018 | 1,440 | 25 | 98% | 0.09 | 8% |
| 4 | 04/29/2018 | 1,440 | 35 | 98% | 0.12 | 12% |
| 5 | 04/30/2018 | 1,440 | 245 | 83% | 0.19 | 16% |
| 6 | 05/01/2018 | 1,440 | 255 | 82% | 0.22 | 18% |
| 7 | 05/02/2018 | 1,440 | 265 | 82% | 0.29 | 24% |
|  |  | 10,080 | 840 | 92% |  | 87% |

Figure 3

Weighting Template

| | Variable | Domain Weight | Weight of respective factor | Weight Score | Weight Score summing to 1 |
|---|---|---|---|---|---|
| Deposit Availability | WTD_DEP_TM_NDX | 0.16 | 0.28 | 0.09 | 0.09 |
| Withdrawal Availability | WTD_Withdrawal_TM_NDX | 0.16 | 0.28 | 0.09 | 0.09 |
| FCI | WTD_FCI_NDX | 0.29 | 0.55 | 0.16 | 0.17 |
| Reopens | WTD_RE_OPN_NDX | 0.17 | 0.55 | 0.09 | 0.10 |
| Fault | WTD_TOT_FL_per_1k_trans_NDX | 0.93 | 0.22 | 0.21 | 0.21 |
| Claim | WTD_claim_per_1k_trans_NDX | 0.96 | 0.22 | 0.21 | 0.22 |
| Response | WTD_avg_res_rep_NDX | 0.21 | 0.55 | 0.12 | 0.12 |

Squared of the rotated factor loading scaled to sum 1

Obtained from variance explained statistic from the Factor Analysis output

Figure 4

METHODS FOR GENERATING A BRANCH HEALTH INDEX

CROSS REFERENCE TO RELATED APPLICATIONS

The application claims priority to U.S. Provisional Application 62/689,912, filed Jun. 26, 2018, the contents of which are incorporated herein in its entirety.

FIELD OF THE INVENTION

The invention relates generally to a method for generating a branch health index based on attributes relating to availability, service times and/or customer impacts.

BACKGROUND OF THE INVENTION

Currently, Banking Center Services have no way of determining the health of ATMs across thousands and thousands of sites. As a result, all escalations on ATMs are received from branch managers and market leads and handled in a reactive manner. This results in inefficiencies, an overwhelmingly large number of customer impacts and a negative experience for branch employees.

These and other drawbacks exist.

SUMMARY OF THE INVENTION

According to one embodiment, the invention relates to a computer implemented method that generates a branch health index. A computer implemented method comprises the steps of: identifying, via a computer processor, one or more devices associated with a branch location; identifying, via the computer processor, a set of variables for each of the one or more devices, wherein the set of variables represent variables that relate to device availability, service times and customer impacts; calculating, via the computer processor, weights using prime numbers to each variable of the set of variables; applying, via the computer processor, the weights for each variable; generating, via the computer processor, a branch index score; and providing, via the computer processor, the branch index score on a user interface.

The method may be executed on a specially programmed computer system comprising one or more computer processors, interactive interfaces, electronic storage devices, and networks.

The computer implemented method and system described herein provide unique advantages to financial institutions, bank service entities, customers and other users, according to various embodiments of the invention. An embodiment of the present invention is directed to providing a comprehensive understanding of ATM performance through an innovative Branch Health Index (BHI) scoring methodology. According to an embodiment of the present invention, a BHI score is based on attributes relating to availability, service response and/or customer impacts. The score may be used to proactively identify poor performing ATMs and address problems prior to escalation. As a result, poor ATM performance may be mitigated and even eliminated thereby allowing for an enhanced ATM customer experience. The innovative method and system reduces the number of down ATMs and further improves customer satisfaction. An embodiment of the present invention is directed to driving a proactive, preventative culture and supporting an organization focused on servicing the branches. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIG. 3 is an exemplary illustration of a BHI weighting methodology, according to an embodiment of the present invention.

FIG. 4 is an exemplary illustration of a BHI weighting methodology, according to an embodiment of the present invention.

DETAILED DESCRIPTION OF THE PREFERRED EMBODIMENT(S)

Figure 1:
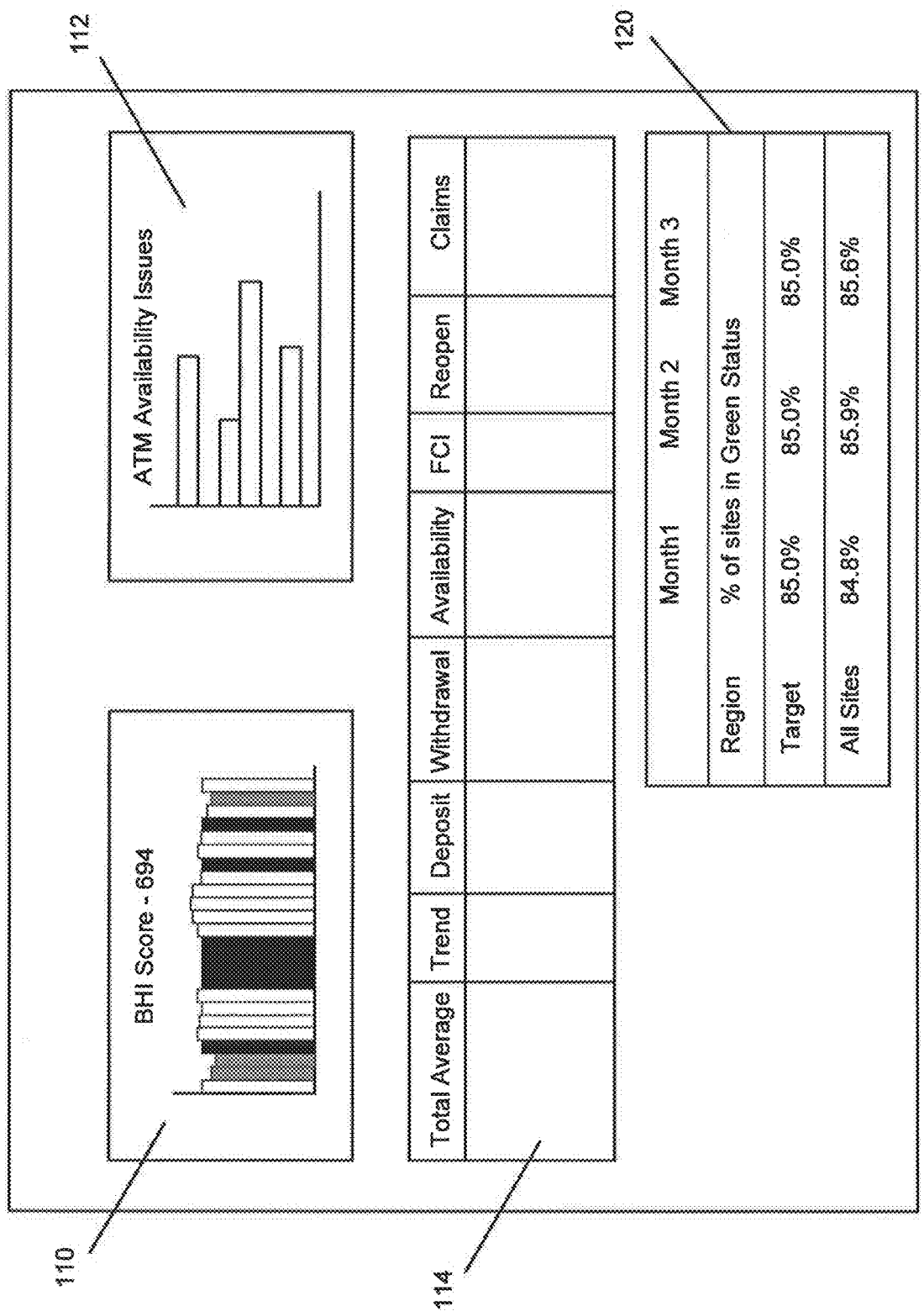
FIG. 1 is an exemplary illustration of a Branch Health Index interface, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to generating a Branch Health Index (BHI) designed to provide a comprehensive measurement of ATM performance and insights. According to an embodiment of the present invention, BHI takes into account ATM availability, service response/repair times and customer impacts to score individual ATMs on a predetermined scale, such as a 1,000 point scale. An embodiment of the present invention is directed to a weighted scoring algorithm that takes into account a multitude of attributes to generate a BHI score. The score may then be used to determine status that may be graphically represented, e.g., color coded status, such as red, amber, green. Other illustrations, schemes and graphics may be used. The output may be incorporated into a business unit to proactively identify poor performing ATMs and drive the escalation as opposed to waiting for a complaint from a branch manager. As a result, poor ATM performance may be proactively identified and promptly addressed. The innovative method and system reduces the number of unavailable ATMs and further improves customer experience and overall satisfaction.

The BHI score may be integrated to support not just ATMs, but any device within the branch and/or business location. The innovative model may also be applied across various product lines or cross products to provide a holistic view of how customers are being serviced. For example, other devices may include any customer facing and/or internal (non-customer facing) devices at a branch location, such as printers, tablets, kiosks, teller devices, wireless devices, smart devices, interactive panels, etc. For non-customer facing devices, customer impacts may refer to banker (or other user) impacts.

The innovative method and system provides a comprehensive monitoring of an overall health of the branch through the Branch Health Index as opposed to viewing devices at a glance. An embodiment of the present invention is directed to handling servicing and escalations based on a common set of rules understood by an entire value chain. The innovation implements a servicing model based on a service quality index and further ensures sustained health and proactive escalation of issues.

An embodiment of the present invention further provides proactive escalation of ATM issues so that branches are kept well informed. The innovative Branch Health Index provides a comprehensive score of the health of each ATM in the branch network. According to an embodiment of the present invention, BHI contributing factors may include: Availability (e.g., Withdrawal, Deposit, etc.); Service Time (e.g., Vendor Response and Repair, etc.); and Customer Impacts (e.g., Failed Customer Interactions and Claims, etc.). Fault priorities may be driven by site-specific requirements based on customer impacts, e.g., single-ATM vs. multi-ATM location. According to an embodiment of the present invention, various measurements and corresponding weights may be applied.

FIG. 1 is an exemplary illustration of a Branch Health Index interface, according to an embodiment of the present invention. Section 110 illustrates a BHI score for a specific ATM during a predetermined period of time. For example, each bar may represent BHI for a particular day. And, a current score may be provided, e.g., BHI Score—694. Each score (e.g., individual bar in Section 110) may be categorized into a color (or other graphic) to indicate branch health. In this example, a selection of RED, AMBER and GREEN may be used. Other graphical variations may be applied. Additional details for each day may be displayed in chart or other format at Section 114. Additional details may include date, ATM Trend (e.g., red, green amber), deposit available (e.g., percentage), withdrawal available (e.g., percentage), availability issues (e.g., numeric representation), FCI, hardware faults, response time, reopen, claims, ATM BHI, Site BHI, trend data, etc. ATM Availability Issues may be detailed at Section 112. ATM Availability Issues may include faults, out of service, weather, out of cash, etc. Section 120 displays a percentage of sites in green status for monthly time periods. Other status data may be captured and displayed.

According to an embodiment of the present invention, RED branches may be defined as any site that scored unhealthy at any point during a reported time period. In this example, a score below 850 out of 1,000 may trigger a site to a RED status. RED status may begin a proactive escalation process to deep dive into ATM issues and bring device(s) back to a healthy status or other threshold. Other actions may be triggered and/or initiated.

Figure 2:
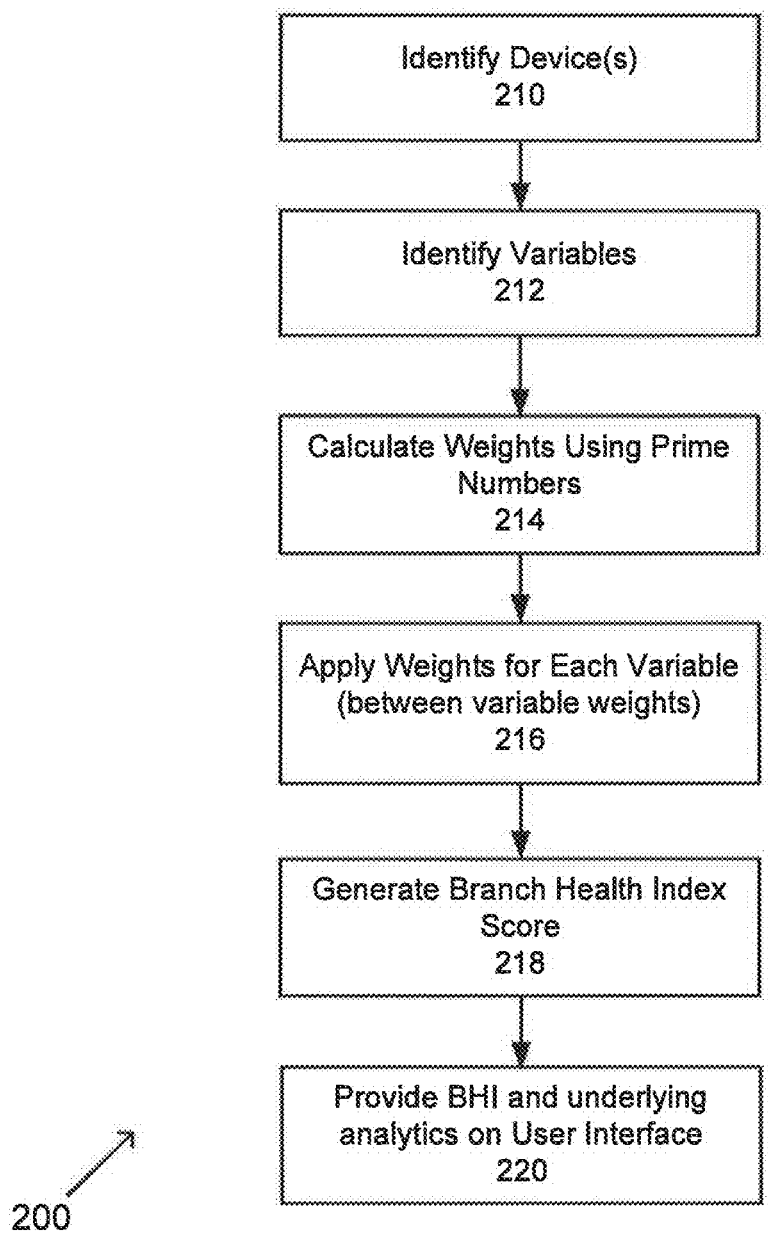
FIG. 2 is an exemplary flowchart of a method for generating a Branch Health Index score, according to an embodiment of the present invention.

FIG. 2 is an exemplary flowchart of a method for generating a Branch Health Index score, according to an embodiment of the present invention. At step 210, one or more devices may be identified. Devices may include ATMs, branch location devices as well as other devices, including printers, tablets, kiosks, interactive displays, teller devices, etc. At step 212, a collection of variables for each device or type of device may be identified. Variables may differ based on device type and/or other factors. At step 214, corresponding weights for each variable may be calculated. According to an embodiment of the present invention, the weights may be determined using prime numbers. Other variations may be applied. At step 216, weights for each variable may be generated and applied. This may include between variable weights. At step 218, a branch health index score may be generated. The score may be for one or more devices located at a particular branch or business location. At step 220, the system may provide the BHI as well as underlying analytics on a user interface. The score may be translated into a corresponding color or icon to graphically indicate device health based on varying threshold values. The order illustrated in FIG. 2 is merely exemplary. While the process of FIG. 2 illustrates certain steps performed in a particular order, it should be understood that the embodiments of the present invention may be practiced by adding one or more steps to the processes, omitting steps within the processes and/or altering the order in which one or more steps are performed.

FIG. 3 is an exemplary illustration of a BHI weighting methodology, according to an embodiment of the present invention. An embodiment of the present invention recognizes that there is a need for within variable weightage rather than a simple average. A simple average loses the ability to identify situations that are having issues for recent days. FIG. 2 illustrates two ATMs AY0001 and AY0002 and corresponding past 7-day rolling availability. In this example, the simple average of availability (Availability B/A) reflects that both have the same availability at 92%. A closer look reveals that AY0002 has had issues recently and had more downtime in recent days while AY0001 seems to have recovered. A simple average would result in escalating both the Terminal IDs resulting in a false positive for AY0001. An embodiment of the present invention recognizes the importance of using weights to better project that AY0002 has more issues recently than AY0001. An embodiment of the present invention uses prime numbers for arriving at the weights used for the model. An embodiment of the present invention recognizes that prime numbers provided better weight spread as opposed to Normal numbers (low) and Fibonacci (high). In other words, it has a relatively better capability to project that AY0002 has more recent issues.

In the example of FIG. 3, the first seven prime numbers start from 2 are 2, 3, 5, 7, 11, 13, 17. Applying the prime numbers illustrates how using these weights will project AY0002 as having issues more recently as compared to AY0001. As shown in FIG. 2, AY0002 has an availability of 87% vs AY0001 at 94% thereby reflecting lower availability and therefore needs more attention for escalating for servicing.

Similar weights may be applied to each of the variables to arrive at a 7-day rolling index. Each variable may have an index at a Terminal ID level. The index represents the weighted data for 7 days using prime numbers. Other variations of prime number methodology may be used.

According to an embodiment of the present invention, variables may include: Deposit Availability; Withdrawal Availability; Failed Customer Interactions (FCI); Claims Rate; Response/Repair Time; Fault Rate, and Re-opens.

Deposit Availability represents an availability variable that refers to the number of hours ATM is available for deposits. Other time periods may be applied.

Withdrawal Availability represents an availability variable that refers to the number of hours ATM is available for withdrawals. Other time periods may be applied.

Failed Customer Interactions (FCI) represents a customer impact variable. FCI may represent an indication of an estimated impact to customers based on peak/non-peak down time. FCI also captures the velocity of customers for a Terminal ID.

Claims Rate may represent a number of claims over a specified time period, a number of transactions or other constant. For example, claims per 1000 transactions is a customer impact variable and represents the number of claims (e.g., deposit and withdrawal) per 1000 transactions.

Response/Repair Time is a service quality variable that represents the total time taken to respond and repair an issue related to the ticket. Response/Repair time may refer to a vendor's response or repair time. An exemplary benchmark may be a predetermined number of hours, such as 4 hours. In this example, anything below 4 hours may be considered a non-issue from a service perspective.

Fault Rate may represent a number of faults over a specified time period, a number of transactions or other constant. Faults per 1000 transactions is a service quality variable and represents the number of dispatched device level/fault tickets per 1000 transactions.

Re-opens may represent a service quality variable and represents the number of re-opened tickets.

Other variables may include Out of Cash, Deposit Bin Full and ATM Type (e.g., Drive-Up, Vestibule, Lobby, etc.)

An embodiment of the present invention may be directed to applying weights for each of these variables which may be referred to as between variable weights.

FIG. 4 is an exemplary illustration of a BHI weighting methodology, according to an embodiment of the present invention. According to an embodiment of the present invention, a statistical technique called Factor Analysis may be used to determine weights for each variable.

An embodiment of the present invention is directed to generating a score for each Terminal ID. As shown in FIG. 4, an exemplary BHI may be calculated as a function of (0.09*Deposit Availability Index+0.09*Withdrawal Availability Index+0.21*Faults Index+0.17*FCI Index+0.10*Re-opens Index+0.22*Claims Index+0.12*Response Time Index).

Figure 5:
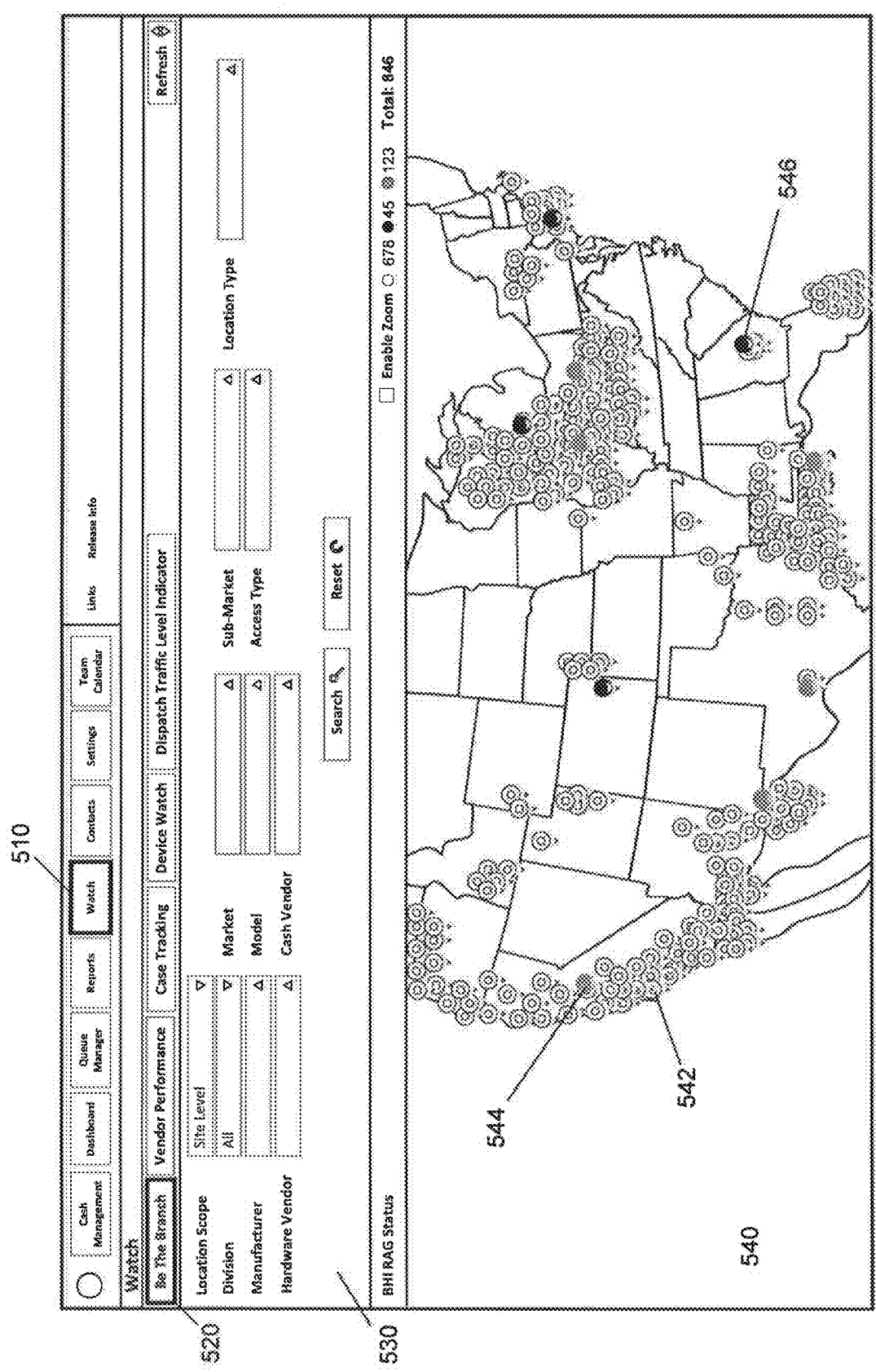
FIG. 5 is an exemplary illustration of a Branch Health Index interface, according to an embodiment of the present invention.

FIG. 5 is an exemplary illustration of a Branch Health Index interface, according to an embodiment of the present invention.

According to an embodiment of the present invention, the Branch Health Index may be designed for multiple facets, including driving an understanding of the overall branch health; identifying poor performing sites (e.g., branches, regions, cities, devices, etc.) and proactively escalating to a resolver team; and identifying design solutions to improve the BHI score. As shown in FIG. 5, an interactive user interface may include various functions, including Cash Management, Dashboard, Queue Manager, Reports, Watch, Contacts, Settings and Team Calendar. FIG. 5 illustrates a Watch function represented by 510. Watch 510 may provide details at a branch level, as shown by 520. Branch level details may be filtered by various factors at 530, including Location Scope, Division, Manufacturer, Hardware Vendor, Market, Model, Cash Vendor, Sub-Market, Access Type, Location Type, etc. At 540, a map with branch location status may be provided. In this example, 540 graphically illustrates branch locations with performance indicators. In this example, icon 542 may represent a green status, 544 may represent an amber status and 546 may represent a red status.

An embodiment of the present invention may be directed to ATM devices as well as other devices, including printers, teller cash recyclers (TCRs), etc.

An embodiment of the present invention may provide an alert or other notification based on a predetermined triggering event or condition. According to another example, a preset action or response may be initiated in response to the predetermined triggering event or condition.

An embodiment of the present invention may be directed to a predictive or trending feature that identifies and correlates recurring issues across ATMs and locations. An embodiment of the present invention may detect issues including recurring faults, supply issues, power issues, etc.

Figure 6:
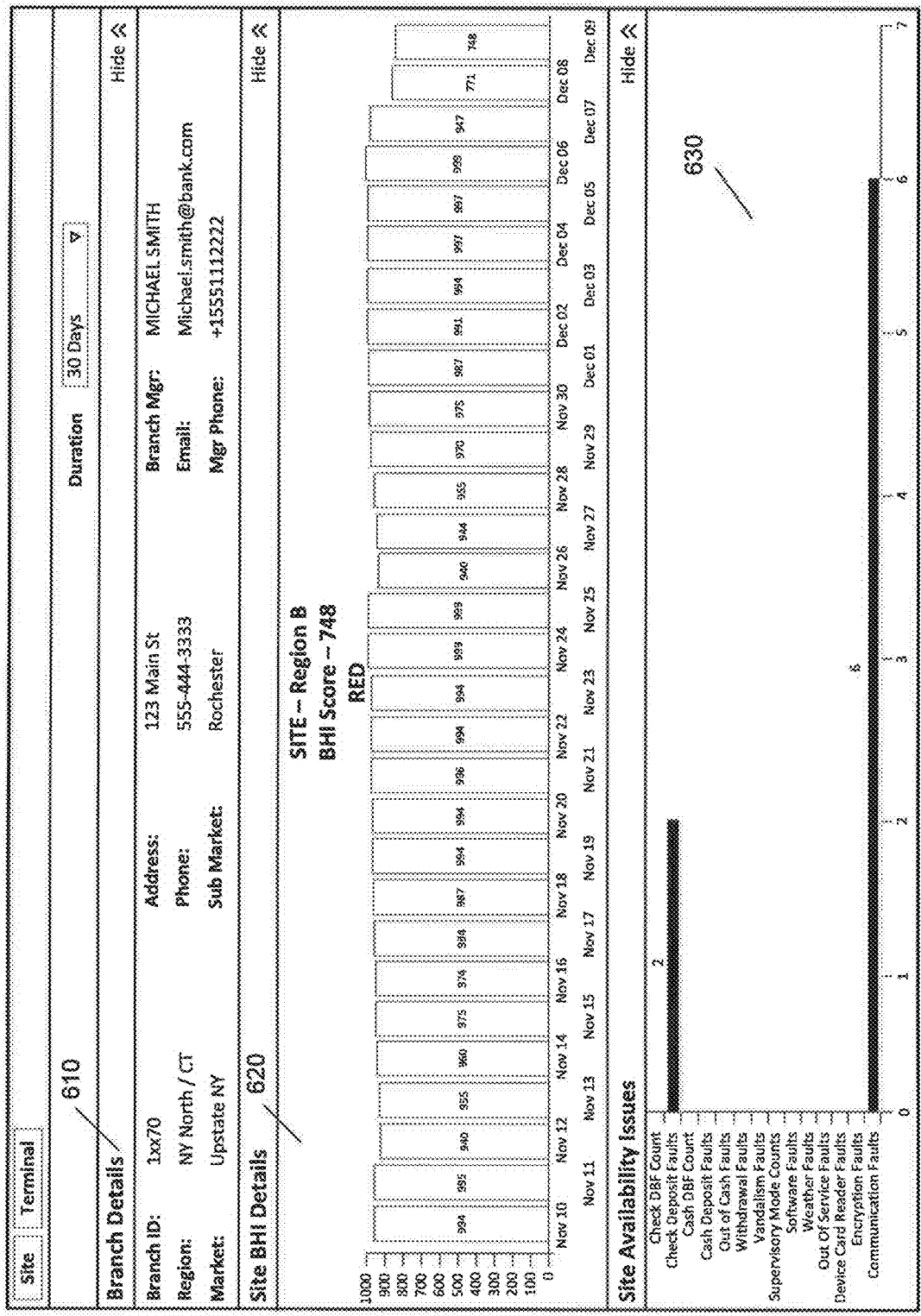
FIG. 6 is an exemplary illustration of a Branch Health Index interface, according to an embodiment of the present invention.

FIG. 6 is an exemplary illustration of a Branch Health Index interface, according to an embodiment of the present invention.

An embodiment of the present invention is directed to providing a daily update to BHI and automatically triggering an escalation case when a site BHI drops below a predetermined threshold, e.g., 900. According to an exemplary scenario, any score under 850 may be considered "red" and therefore a miss for the month. With an embodiment of the present invention, a user (e.g., specialist, etc.) may research the drivers for a poor BHI score and work with business partners to determine a root cause and resolve the issue and further prevent similar issues a site and/or other similar sites and devices.

As shown in FIG. 6, Branch Details may be provided at 610, Site BHI Details at 620 and Site Availability Issues at 630. Branch Details 610 may include Branch Identifier, Region, Market, Address, Phone/Contact; Sub Market; Branch Manager; email address, Manager Phone/Contact, etc. Site BHI Details 620 may illustrate scores for a particular site across a predetermined period of time. As shown in FIG. 6, region B has a current BHI score of 748 which translates to a "red" score. Site Availability Issues 630 may include a count or other metric of various issues, including Check Deposit Bin Full (DBF) Count, Check Deposit Faults, Cash DBF Count, Cash Deposit Faults, Out of Cash Faults, Withdrawal Faults, Vandalism Faults, Supervisory Mode Counts, Software Faults, Weather Faults, Out of Service Faults, Device Card Reader Faults, Encryption Faults and Communication Faults. Other issues may be captured as well.

An embodiment of the present invention may provide BHI scores in a batch mode (e.g., once a day). According to another example, BHI scores may be provided in real-time and continuously update. BHI scores may be for a particular branch location and may also be aggregated to represent a BHI score for a city, region and/or other geographic area.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A computer implemented method for generating a branch health index score (BHI), the method comprising the steps of:
   identifying, via a computer processor, one or more automated teller machines (ATMs) associated with a branch location;
   identifying, via the computer processor, a set of variables for each of the one or more ATMs comprising deposit availability, withdrawal availability, failed customer interactions, claims rate, repair/response time, fault rate, and re-opens;
   calculating, via the computer processor, a weighting for each variable from the set of variables where the weighting comprises a combination of relative weighting for a variable as compared to each other variable from the set of variables and an inter-variable weighting for the variable based on a performance trend of the variable over a 7-day rolling index that is calculated using prime numbers;
   applying, via the computer processor, the weighting for each variable;
   generating, via the computer processor, a branch index score; and
   providing, via the computer processor, the branch index score on a user interface.

2. The method of claim 1, wherein the user interface comprises a map interface with branch locations.

3. The method of claim 2, wherein each branch location displays a corresponding status icon.

4. The method of claim 1, wherein the user interface displays branch specific details comprising location, manufacturer and model.

5. The method of claim 1, wherein the user interface displays site BHI details comprising BHI scores across a predetermined time period.

6. The method of claim 1, wherein the user interface displays site availability issues.

7. The method of claim 6, wherein the site availability issues comprise corresponding counts for each availability issue.

8. The method of claim 1, wherein the site availability issues comprise a plurality of faults and counts.

9. A computer implemented system for generating a branch health index score (BHI), the system comprising:
   a memory;
   a user interface that receives one or more inputs from a user;
   a computer processor, coupled to the memory and the user interface, the computer processor configured to perform the steps of:
   identifying one or more automated teller machines (ATMs) associated with a branch location;
   identifying a set of variables for each of the one or more ATMs comprising deposit availability, withdrawal availability, failed customer interactions, claims rate, repair/response time, fault rate, and re-opens;
   calculating a weighting for each variable from the set of variables where the weighting comprises a combination of relative weighting for a variable as compared to each other variable from the set of variables and an inter-variable weighting for the variable based on a performance trend of the variable over a 7-day rolling index that is calculated using prime numbers;
   applying the weighting for each variable;
   generating a branch index score; and
   providing the branch index score on the user interface.

10. The system of claim 9, wherein the user interface comprises a map interface with branch locations.

11. The system of claim 10, wherein each branch location displays a corresponding status icon.

12. The system of claim 9, wherein the user interface displays branch specific details comprising location, manufacturer and model.

13. The system of claim 9, wherein the user interface displays site BHI details comprising BHI scores across a predetermined time period.

14. The system of claim 9, wherein the user interface displays site availability issues.

15. The system of claim 14, wherein the site availability issues comprise corresponding counts for each availability issue.

16. The system of claim 9, wherein the site availability issues comprise a plurality of faults and counts.

* * * * *